Aug. 6, 1935.  S. L. KERR  2,010,594
CONTROL SYSTEM AND APPARATUS FOR POWER GENERATING EQUIPMENT
Filed Sept. 5, 1931  4 Sheets-Sheet 2
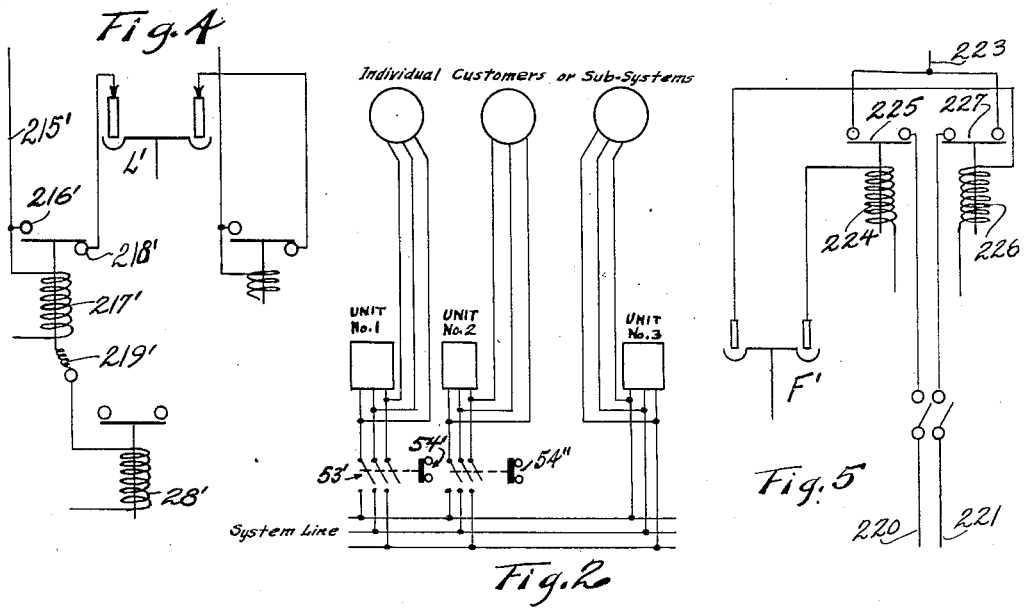
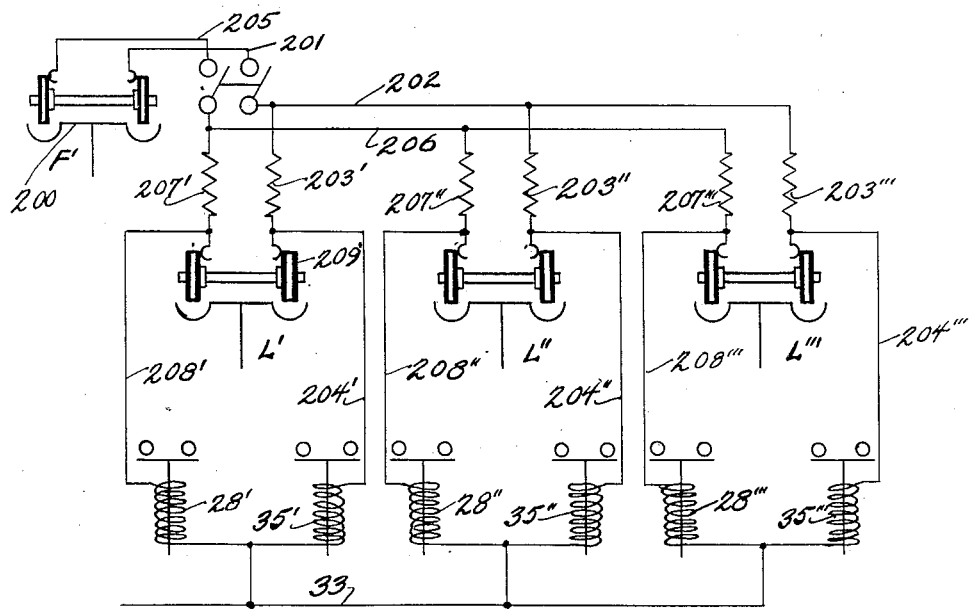
INVENTOR
S. Logan Kerr
BY
Edward ........ ATTORNEY INVENTOR
S. Logan Kerr Patented Aug. 6, 1935

2,010,594

UNITED STATES PATENT OFFICE 2,010,594

CONTROL SYSTEM AND APPARATUS FOR POWER GENERATING EQUIPMENT

Samuel Logan Kerr, Philadelphia, Pa.

Application September 5, 1931, Serial No. 561,460

30 Claims. (Cl. 290—4)

This invention relates generally to power generating control apparatus and more particularly to improved means for effectively and economically controlling a plurality of prime mover operated alternating current generating units especially of the hydro-electric type.

In many of the large generating stations recently constructed the operation of the plant is affected greatly by the many interconnections between various generating systems. Many of these interconnections are controlled or supplied directly from the generating plant and require great flexibility in the operation of the station and impose a severe burden on the operating staff particularly when emergency conditions arise on one of the systems which may be transmitted to others. Such plants located at strategic points in the interconnected network must be capable of operating on base load with all systems in parallel or of controlling speed on a large interconnected network or of supplying fixed amounts of power to each of several systems when the various systems are disconnected one from the other or supplying speed control to one system and at the same time supplying fixed amounts of power to other systems separated from the first but sometimes interconnected with the first. There is also the requirement for reserve capacity and standby service as well as synchronous condenser operation for power factor correction, all of these types of service being required from the same plant and the same generating equipment. One purpose of the control system described herein is to provide automatic means for accomplishing the various functions outlined in order to simplify the operation of the station, to control speed and also to control the economic load distribution between units as well as providing automatic means for bringing reserve units into operation without requiring the attention of the men on duty.

In one specific embodiment comprising a high head hydro-electric generating station, three major power systems are interconnected in the switchyard adjacent to the generating plant and are under control of the operator in the plant at the generating room switchboard. A normal functioning of the systems calls for the parallel operation of all three with a fixed amount of load being fed into the network and with the various units in this particular plant operated on base load with the output economically divided between the various units. In the event of an emergency such as a lightning disturbance or fault on the transmission network of any one of the three systems, the interconnections between the systems will be opened automatically or manually by the operator and simultaneously with this it is desired to redistribute the load between the various units in accordance with the specific requirements of the respective systems to which they will be connected as a result of the rearrangement of the transmission networks due to the separation of the various systems. Each unit should supply a fixed amount of load to each system in accordance with the requirements of that particular system as determined by the respective operating staff, the amount being determined either by verbal instructions from load dispatchers or by contract agreements. At the same time should anyone of the systems to which a particular unit was assigned in this emergency program be unable to absorb the amount of power in accordance with the instructions or for reasons of operating emergency or for any other reason, the speed of that particular system will be affected and it would be desirable at that time to have automatic frequency control come into action to stabilize the speed on that particular system by adjusting the output of the unit at this strategically located plant.

The automatic control as described in detail herein is designed primarily for this service as the station is normally operated with three units connected in parallel and upon an emergency occurring, one unit will be assigned to each of the major generating networks which in turn will be separated from each other by means of the switching equipment located adjacent to the plant. Following this segregation of the systems the normally interconnected control of the units will be automatically segregated, and each unit will go over to an independent fixed load which has been predetermined by operating instructions to the local operating staff. If any one system cannot absorb the power supplied to it by its unit thereby resulting in the speed (frequency) departing from normal a predetermined amount for some predetermined period, the independent fixed load control load cut-out and automatic frequency control on that particular unit will be placed in service to adjust the output of the unit to the desired amount in order to hold the frequency at or near its normal value. All of these functions are arranged to act automatically and are described in detail herein.

In case it is desirable to operate the systems independently, the control is sufficiently flexible to permit each unit to be operated on independent base load as a normal function or each unit can control speed on an individual system which is separated from the remaining units on frequency control or may be in parallel with other units which are controlling fixed load.

An additional form of operation consists in having one unit on frequency control with the remaining two units on base load control or of having all three units on frequency control with automatic economic load division maintained simultaneously.

The operation of this station also includes improved means whereby stand-by service provides reserve capacity for system operation in the event of emergencies which occur during periods when it is undesirable to utilize flow from the station for the purpose of power generation. This condition is frequently met in hydro-electric plants having pondage or seasonal storage. For this type of operation the reserve units are motored from the line with the hydraulic turbine runner arranged to revolve in air either by the action of automatic air vents or by the draining of the wheelcase after the machine has been brought up to synchronous speed and paralleled with the system. Such reserve units must be operated in such a manner that the runner is kept free from water which requires that the gates be kept tightly closed or that the penstock valve at the entrance to the turbine be closed and the wheelcase kept drained. In either event it will be necessary for an operator to release the turbine gates or to open the penstock valve and prime the wheelcase before load could be picked up on this reserve machine. The automatic equipment described herein includes means whereby the turbine casing can be primed and the penstock valve fully opened, the turbine gates released and the unit permitted to pick up load without the necessity of the operator performing any of these operations. The initial tripping of this control equipment is arranged to operate as a function of the system speed so that the units are transferred from condenser service to load upon any drop in system frequency below some predetermined point or else by the action of the operator in pushing a release button or by any other desirable means.

Improved means are also provided with this automatic control so that the units can be placed on condenser operation, the turbine gates set at a fixed position, the penstock valve closed and the casing drained merely by having the operator close a selector switch located in the control room, thus simplifying greatly the work which he is required to do and enabling him to have complete control over the generating unit whether for generating purposes or for synchronous condenser operation, without the necessity of leaving the control room or of having another operator for this purpose.

In describing this control equipment and its various functions as applied to the different operating arrangements, the phrase "interconnected control" will imply that it is the control equipment for the units which is interconnected as when the generating units are connected in parallel with the same system, but if the various units are separated from their parallel connection with each other then the control for each unit will also be segregated and each unit will operate independently of the other, this being herein referred to as a so-called independent type of unit operation. It is possible, however, to operate the various unit controls either partially or wholly independently of each other even though the generators are in parallel with the same system, this being herein broadly referred to as independent control while its specific functions are defined as independent base load, independent frequency control, etc.

Other objects and advantages will be more apparent to those skilled in the art from the following description of the accompanying drawings wherein:

Fig. 1 is a wiring diagram illustrating one form of my invention;

Fig. 2 diagrammatically shows a power system equipped with my invention and arranged for disconnecting the units from the line in order that they may be operated independently thereof and of each other;

Figs. 4 to 6 are diagrams illustrating modified arrangements for controlling the frequency and load control impulses.

In the description herein the various types of operations are suitably indicated by type members although it will be understood that this is merely for convenience of understanding.

*Type 1 operation: unit No. 1 on frequency control with units Nos. 2 and 3 on base load control.*—In this operation units Nos. 2 and 3 are maintained at a constant combined output (base load) while the output of unit No. 1 is varied to maintain constant station frequency, it being understood that all three units are in one station although it may be considered in the broad aspect of the invention that each unit represents a station by itself and that the three units are connected in parallel to a common system. In accordance with previous applications of mine the constant fixed load is economically distributed between the two units in accordance with their respective operating characteristics. As explained in said applications the units may have similar or dissimilar characteristics but in either case the load is automatically economically distributed between the two units.

Figure 1:
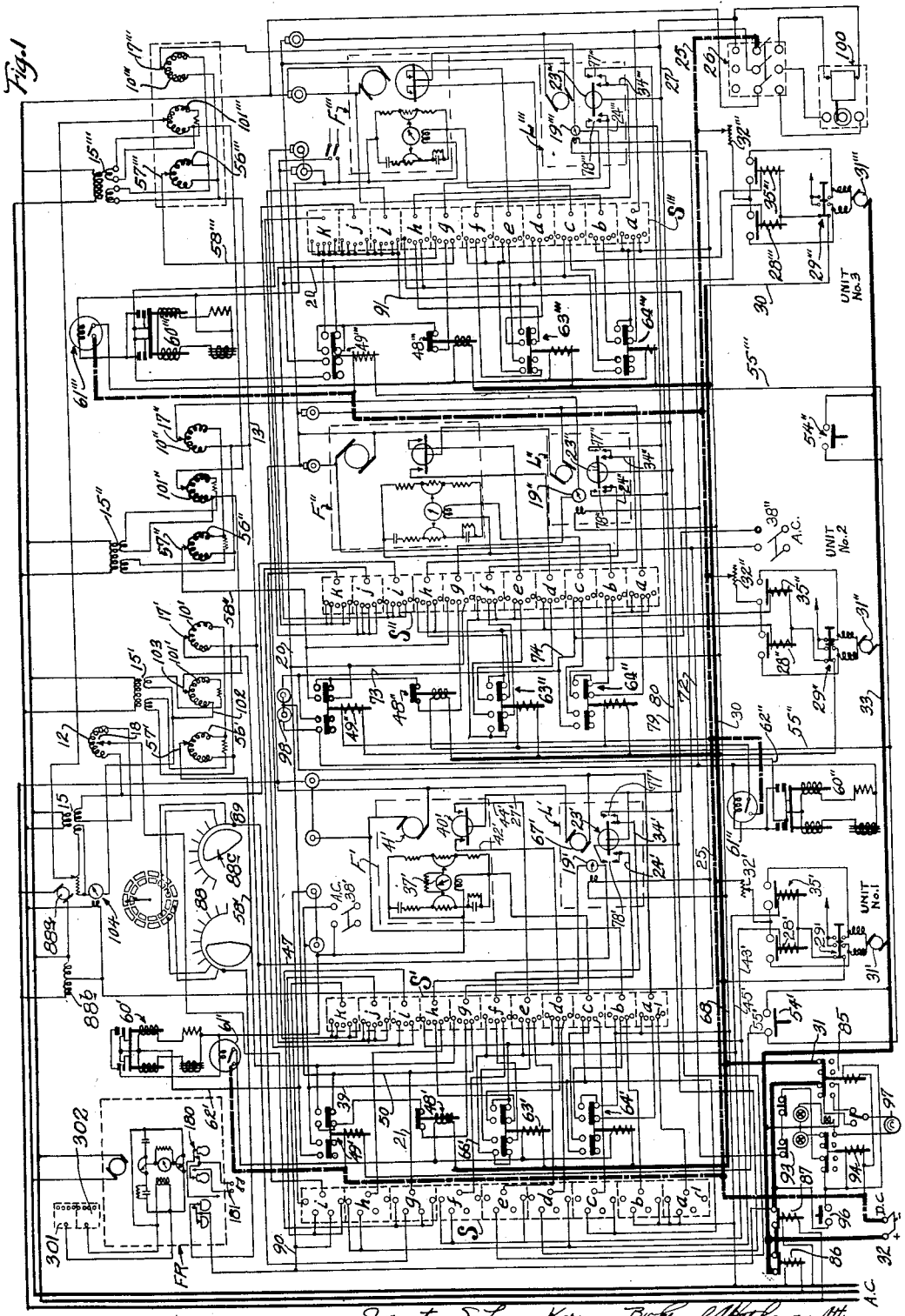

Base load control of units 2 and 3 will be first described and then the frequency control of unit 1 will follow. A master selector switch S (left side Fig. 1) is placed in position 1. This switch consists of a series of individual switch sections a—i. Each section is enclosed by a dotted line box and has four contacts diagrammatically shown as concentrically arranged about a central pivot of a suitable switch arm (not shown) which is adapted to selectively engage any one of the concentric contacts. The switch arms of each switch section are connected together by a common operating means (not shown) so that all switch arms are in the same position for any adjustment of the switch. The lowermost contact in each box is position 1 and the next contact position 2, etc. The type of switch used in actual practice may be any of the commercial forms of transfer switches one of which is specifically referred to in my copending application filed March 26, 1931, Serial No. 525,355. A unit selector switch S' (the single prime representing unit No. 1) is placed in position 3. This switch is of the same general type as the master selector switch S except five concentric contacts are shown. The first contact, however, represents an "off" position so that position No. 1 is the second contact from the bottom of each box, position No. 2 the third contact, etc. Unit selector switches S'' and S'''

(the double prime representing unit No. 2 and the triple prime unit No. 3) are each in position 1, this position being also the second contact from the bottom of each dotted line box. These switches are also of the same general type as the master selector switch S.

In this present description it will be assumed that the system is in operation and that each unit, preferably of the hydro-electric type, is provided with an electric generator 4 driven by a hydraulic turbine generally indicated at 5, Fig. 6, the turbine having an inlet casing, a runner and adjustable turbine gates, all as well understood in the art. In accordance with usual practice, the turbine gates are adjusted by a servo-motor 6 which in turn is controlled by a speed responsive governor 7 having a usual synchronizing or load adjusting motor 31', Fig. 1. This load adjusting motor and its functions are well known in the hydraulic turbine art and its use in the general type of automatic control equipment here being considered was described more in detail in my copending application, Serial No. 408,544 filed November 20, 1929. Hence a detailed description is not necessary here and it will suffice to state that when the motor is operated in one direction or the other the gates of the turbine, or the control valves such as are used with other types of prime movers, are actuated so as to increase or decrease the power input to its unit, the direction of rotation depending upon whether raising or lowering control impulses are transmitted to the load adjusting motor. These control impulses are of two kinds, one for frequency control and the other for load control and each one is adapted to effect both raising and lowering of the load adjusting motor. As similarly described in said copending application the functions of my improved automatic equipment herein described are also superimposed on the normal functions of the governor.

It will be assumed that the units have similar operating characteristics so that, for instance, the most economic load distribution between units 2 and 3 requires equal loading. To maintain a fixed combined output or base load on these two units there is provided a single master load setter for cooperation with all units and unit load transmitters one for each unit. Each unit transmitter is balanced against the master load setter so that upon occurrence of any unbalance a galvanometer controlled circuit causes control impulses to be transmitted to the load adjusting motors. This particular arrangement has been described in detail in said copending application, and hence it will suffice to briefly point out here only the general features of such an arrangement. Units 2 and 3 are provided respectively with these unit load transmitters in the form of potentiometers or resistances 10" and 10''', each rotatably actuated by a wattmeter of their respective units in the manner described and shown in my other application. A master load setter 12 is in the form of a manually operated rotatable resistance. One side of the resistances 12, 10" and 10''' are connected together to insure, as by a wire 13, the same potential at that end of each resistance. The other end of each resistance is connected to individual transformers such as 15, 15" and 15''', the primaries of each of which are connected across the same phase of the A. C. supply (upper left side of Fig. 1). The potential of each transformer is the same so that the potential across each resistance is also the same. A galvanometer circuit for unit 2 is bridged from a slide contact 17" to a slide contact 18 of the master load setter, this circuit passing from contact 17" through galvanometer 19" thence to and across selector switch S"g in position 1, to the left along wires 20 and 21 to switch Sg in position 1 and thence to slide contact 18 of the master load setter.

A similar galvanometer bridge circuit for unit 3 is provided between slide contact 18 of the master load setter and slide contact 17''' of the unit load transmitter 10''', this circuit extending from slide contact 17''' through galvanometer 19''' to S'''g in position 1 connected to common wire 20, which then follows the same circuit as just previously described for the galvanometer 19".

Assuming that this type 1 operation requires a given combined output on units 2 and 3 the operator manually adjusts master load setter 12 in accordance with suitable graduations on a dial whereupon an unbalanced potential will exist between contacts 17" and 18, and 17''' and 18, thus causing current to flow in the bridged circuits of the galvanometers 19" and 19'''. As these galvanometers deflect to one side or the other of their neutral depending upon whether the combined load is increased or decreased, contact-making devices 23" and 23''' will operate to cause control impulses to be transmitted to their respective load adjusting motors thereby adjusting each unit to increase or decrease its power output in accordance with the setting of the master load setter. As the load on the respective units is adjusted their respective wattmeters will cause resistances 10" and 10''' to be actuated until positions thereof are reached which will cause a balanced potential between the contacts 18, 17" and 17''' at which time current will no longer flow through the bridge circuits and the galvanometers will remain in their neutral position.

The contact-making mechanisms 23" and 23''' and also 23' to be mentioned later are each of the type more fully described in my copending application, Serial No. 408,544. It will suffice to point out here that when the potential at either one or both of the contacts 17" and 17''' is greater than at contact 18 of the master load setter the series of periodic control impulses are transmitted through wires 24" or 24'''. The length of time of these periodic contacts varies with the degree of difference in potential between the master load setter and unit load transmitters so that as the difference in potential approaches and finally arrives at zero, the control impulses transmitted through these wires become correspondingly shorter until finally no contact is made thereby indicating that the unit is properly adjusted.

The circuit for wire 24" and 24''' is from the main D. C. supply lead 25 through relay 28", 28''' (lower right corner Fig. 1), across the upper right contacts of the two-way switch 26 to wire 27 leading in common to each of the contact-making devices 23" and 23'''. The wire 24" is connected across switch S"h in position 1 and thence down to the coil of relay 28", across the closed left contacts of switch 29" to the other side of the D. C. supply line 30 which is connected as by wire 31 through a protective circuit to be described later and to the main D. C. supply switch 32. Energization of coil relay 28" closes its contacts whereupon the load adjusting motor 31" is rotated in a direction to lower the load on its unit. The motor circuit is from D. C. supply line 25 through a manually adjustable resistance 32" across contacts of relay 28" and through the lowering (left) field of motor 31'' to the other side of the D. C. supply line 33.

If the difference in potential between contacts 18 and 17'' requires an increase in load then contact-making device 23'' intermittently closes a circuit through a wire 34'' which is connected across switch S''f in position 1 and thence down to the coil of relay 35'' the remainder of the circuit for which is the same as for wire 24''. Upon energization of relay 35'' its contacts are closed whereupon current is supplied to the raising (right) field of motor 31'' as from the D. C. supply line 25 through the resistance 32'' and on to the other side of the D. C. supply wire 33. The motor will thereupon be actuated to raise the power output of the unit until no difference in potential exists between contact 17'' and 18.

The same general contact-making and relay control circuit is used for load adjusting motor 31''' in that the wire 24''' is connected through switch S'''h in position 1 and down to the coil of relay 28''' and across the closed left contacts of switch 29''' to the other side of the D. C. supply. Energization of relay 28''' establishes a circuit from D. C. supply line 25 through resistance 32''' across the closed contacts of relay 28''' to the lowering field of the load adjusting motor 31'''. The other wire 34''' is connected through switch S'''f in position 1 and thence down to the coil of relay 35''' to the other D. C. supply line 30. Closure of the contacts for this relay establishes a circuit through the resistance 32''' across the closed contacts of 35''' to the right or raising field of load adjusting motor 31'''.

From the foregoing description it is seen that when the master load setter 12 is set for a fixed total output of units 2 and 3 the galvanometer 19'' and 19''' of these units will be actuated in accordance with the potential difference not only between contacts 17'' and 17''' with respect to contact 18 but also of contact 17'' with respect to contact 17''' or vice versa. If any difference in potential exists between contact 17'' and 17''' the units will be adjusted with respect to each other so as to raise the load on one and decrease the load on the other until the outputs of these units will equal the total combined output desired. If the units are of dissimilar characteristics the resistances 10 or 11 may have portions short-circuited substantially in accordance with the characteristics of their respective units all as described in my copending application Serial No. 408,544.

*Type 1 operation (cont'd): frequency control by unit No. 1.*—In this further phase of type I operation unit 1 is used to control frequency of all the units while at the same time the base load units are operated to give a fixed combined output as just described. To control frequency however it is necessary to vary the output of a unit in accordance with frequency variations and to accomplish this it is necessary to permit transmission of only frequency control impulses to the unit and prevent transmission of load control impulses. To do this the load controller L' is prevented from transmitting its control impulses to the load adjusting motor 31' of unit 1 due to the fact that wires 24' and 34' are connected to switches S'h and f respectively each of which rests upon an open contact in position 3.

The frequency controller F' is of the type having an impedance bridge with a galvanometer 37'. This bridge and the galvanometer field are supplied from an A. C. source 38' one wire of which leads directly from the switch to both the impedance bridge and galvanometer field while the right hand wire from switch 38' is connected as by wire 39 to switch S'c in position 3 and thence to the impedance bridge and galvanometer field. Upon variations of frequency from normal the galvanometer 37' will cause actuation of contact-making device 40' so as to increase or decrease the output of unit 1 in accordance with whether the frequency variation is above or below normal. This contact-making device with its continuously operating motor 41' is of the same general type used in the load controllers. The result is that if the frequency rises galvanometer 37' swings so as to cause intermittent control impulses to be transmitted through wire 42' across switch S'd in position 3 and thence down and across by wire 43' to the coil of relay 28' the circuit for which is completed across the left closed contacts of switch 29' to the D. C. supply line 30. Closure of contacts of relay 28' establishes a circuit from D. C. supply line 25 through resistance 32' across contacts of relay 28' to the left or lowering field of motor 31' and thence to the other side 33 of the D. C. supply. This lowers the power output of unit 1 and thus corrects the frequency.

If the frequency should drop below normal thereby necessitating an increase in power, then control impulses would be intermittently transmitted through wire 44' across switch S'e in position 3 and thence down to wire 45' to the coil of relay 35' and thence to the other side of the D. C. supply line 30 in the same manner as for relay 28'. Energization of relay 35' establishes a circuit from resistance 32' across the relay contacts and to the right or raising field of motor 31' and thence to the other side of the D. C. supply line 33. The output of unit 1 is thereupon raised so as to correct the frequency. The characteristics of the contact-making device 40' of the frequency controller in gradually diminishing the extent of each control impulse is the same as with the load controllers thereby insuring stable operation of the equipment.

*Type 2 operation: control of all units interconnected on station base load.*—In this operation the total station output is maintained at a fixed value and the load equally distributed between the units, assuming that they each have identical characteristics. As previously described with units 2 and 3 operating with a combined fixed output the unit transmitter resistances 10'' and 10''' are balanced against the master load setter 12. In order to have unit No. 1 similarly operated in this combination its unit load transmitter 10' is connected in parallel with the other transmitters 10'' and 10''' and all three are balanced against the master load setter 12. To accomplish this the master selector switch S and each of the unit selector switches are all placed in position 2. This causes the load controllers for each unit to be interconnected and also causes disconnection of the frequency controllers. Assuming that the master load setter 12 is readjusted by the operator so as to increase or decrease the total station output then a difference in potential will exist between the master slide contact 18 and each of the unit slide contacts. Taking first the difference in potential between the master slide contact 18 and the unit slide contact 17' the galvanometer 19' of the load controller L' will be deflected by current flow in the galvanometer bridge circuit which extends from slide contact 17' through wire 47 to galvanometer 19', thence to switch S'g in position 2 and across the contacts of relay 48' normally closed when deenergized, thence across the lower right pair of contacts of relay 49' also normally down when deenergized, along wires 50 and 21 and across switch Sg in position 2 to contact 18 of the master load setter.

The bridge circuit between unit slide contact 17'' and master slide contact 18 extends from contact 17'' through galvanometer 19'' across switch S''g in position 2, thence across contacts of relay 48'' normally closed when deenergized, and across the lower right pair of contacts of relay 49'' normally down when deenergized, thence up to wire 20 and down to wires 50 and 21 and thence on as previously described to master contact 18.

The bridge circuit for unit 3 is now from unit slide contact 17''' through galvanometer 19''' across switch S'''g in position 2, across contacts of relay 48''' normally closed when deenergized, and thence up and across lower right pair of contacts of relay 49''' normally down when deenergized, thence up along wire 70 to wires 50 and 21 and on to master contact 18.

It will be noted that one end of unit load transmitter 10' is connected to the wire commonly connected to one end of each of the other unit load transmitters, this in order to maintain the same potential on each, while the other end of the transmitter 10' is connected to a potential transformer. As a result the units will all be adjusted to the same output because if any difference in potential exists between any pair of contacts the output of the respective units will be raised or lowered as is necessary to establish equal loading.

*Type 2 operation (cont'd): one or more units are disconnected from system line to supply a customer independently (either base load or frequency control); other units remain connected to system line but each of these units is transferred to its own independent base load.*—As shown in Fig. 2 the three units are connected to a system line designated as such and three customers such as a city, town, manufacturer or the like are also shown connected to the system line. If the power demand by one customer should fall below a predetermined value it is desired to disconnect that customer from the system line and supply current from an individual station or unit. This is desirable in order to maintain the maximum combined efficiency for the system, it being understood that it is more efficient to operate the remaining units at their point of maximum efficiency and allowing possibly the one unit which is independently connected to the one customer to operate at a lower efficiency. On the other hand it might be that when one customer's power demand exceeds a predetermined amount it is also desirable to supply him from an individual plant entirely disconnected from the system line.

It is further desirable upon disconnecting any one unit from the system line in order to supply the independent customer, to place each of the remaining units on unit base load, that is, each unit will be controlled so as to give a fixed unit output irrespective of the fixed output for which another unit might be adjusted. With this arrangement the total station output or station base load is not maintained in accordance with the setting of the master load setter 12 but must now be regulated for each unit alone.

Disconnection of one unit, say unit No. 1, is effected by opening the oil circuit breaker diagrammatically indicated at 53', Fig. 2. Upon opening of the circuit breaker a switch 54' is closed, (Fig. 2 and near bottom left corner of Fig. 1) this switch being suitably mechanically or otherwise connected to the circuit breaker to compel closing of switch 54'. Closure of switch 54' causes each unit to be placed on independent base load. The circuit is established from one side of the D. C. line by a wire leading from the right contact of switch 54' down to line 33 and a wire leading upwardly from the left contact to relay 49' which is connected to the other side of the D. C. supply. A wire also leads downwardly from the left contact of switch 54' from which a wire 55'' leads upwardly to relay 49'' which is connected to the other side of the supply line 25. Also, a third wire 55''' leads up to relay 49''' which also is connected to the other side of the D. C. wire leading downwardly to wire 25. Thus relays 49', 49'' and 49''' are energized and moved to their up position. As a result the slide contact 18 of the master load setter is disconnected from the galvanometer circuits for each unit and the unit load setters are substituted.

The function of the unit load setters is to each unit what the master load setter is to the combined units, so that a fixed output of each unit may be established independently of the other units. The unit load setters are indicated at 56', 56'' and 56'''. In unit 1, slide contact 17' is now connected to a slide contact 57', this circuit extending away from contact 17' to wire 47 through galvanometer 19' across switch S'g in position 2 and across contacts of relay 48' still in its down deenergized position and thence across the upper right pair of contacts of relay 49' and thence upwardly along wire 58' to slide contact 57'. It is thus seen that for any fixed adjustment of unit load setter 56' the galvanometer will respond in accordance with any difference in potential between slide contacts 57' and 17' thus causing a contact-making device 23' to transmit control impulses either to the lowering or raising relays 28' and 35' of the load adjusting motor 31' all as previously described with type 1 operation.

The bridge circuit for unit 2 is similar to that just described, in that it extends away from contact 17'' through galvanometer 19'' across switch S''g in position 2 and across contacts of relay 48'' still deenergized in a down position, thence across upper right pair of contacts of relay 49'' to wire 58'' and slide contact 57''. A similar circuit is established from slide contact 17''' through galvanometer 19''' across switch S'''g in position 2, contacts of relay 48''' and upper right pair of contacts of relay 49''' to wire 58''' and slide contact 57'''. It is thus seen that the output of the respective units 1—3 can be in any desired ratio.

Subsequent disconnection of another unit from the system line in order to supply another customer independently does not effect any further changes in the unit base load circuits just described because upon opening of a circuit breaker such as 53'' for unit 2, Fig. 2, control switch 54'' (bottom Fig. 1) will simply establish the same circuit from D. C. supply line 33 to the wires 58', 55'' and 55''' as was established by switch 54'. It is seen, however, that if units Nos. 1 and 3 are maintained connected in parallel to the system line and should it be desired to disconnect unit No. 2 therefrom, then switch 54'' will function to place each unit upon independent base load. It will of course be understood that switches of the general type 53', 54' could be applied to each unit if desired but for purposes of modification, unit No. 3 in Fig.

2 has been shown without such a switching arrangement.

*Automatic frequency control of the independent systems just described: automatic transfer from unit base load to frequency.*—If the frequency varies on an independent system, the frequency controller of the unit which supplies that system will be automatically brought into operation, the unit thereafter not being on base load. If two or more units are connected in parallel and are on unit base load, the frequency controller of these units cannot be brought into operation upon variation in frequency, this variation being corrected by other plants or units assigned for this purpose.

Considering unit No. 1 which is assumed to be the independent unit, when its frequency varies a certain predetermined amount from normal (upper left corner Fig. 1) a frequency relay 60' is actuated so that its contact bar tilts in one direction or the other, depending upon the direction of variation from normal, to close one or the other pairs of contacts, thereby energizing time delay relay 61' by a circuit extending from the right side of the time delay relay coil down to the left side of A. C. supply switch 38' while the right side of this switch is connected across the left upper pair of contacts of relay 49' and thence to wire 62' which is connected to the lower set of contacts of frequency relay 60', the upper ones of which are connected to the coil of time delay relay 61'. If the frequency variation continues for a predetermined length of time as established by the time delay relay, the switch of this relay will close thereupon connecting the direct current supply line, shown in heavy lines as leading from D. C. supply switch 32 (lower left corner Fig. 1), to energize relays 48', 63' and 64' connected in parallel across the two D. C. supply lines, one of which is 25. Relays 63' and 64' when energized are raised to their up position and are of the manually releasable type, whereby upon return to normal frequency they will remain in their up position unless manually released. Upon raising of relay 63' the lower left contacts break the circuit through switch S'f in position 2 to which wire 34' of the load controller is connected and similarly the lower right pair of contacts of relay 63' break the circuit through switch S'h to which wire 24' of the load controller is connected. However, when the relay is thus raised the frequency controller is connected by wire 44' leading from the frequency controller through switch S'e in position 2, across upper left pair of contacts of relay 63' and then along wire 66' to wire 45' which is connected to the raising relay coil 35' of the load adjusting motor. The frequency controller is connected across switch S'd in position 2 to the upper right pair of contacts of relay 63' and thence over and down to wire 43' connected to the lowering relay 28'.

When relay 64' is raised the circuit of the load controller motor 67' is broken by reason of the circuit for this motor having a wire leading downwardly therefrom across switch S'a in position 2 to the lower right pair of contacts of relay 64' which by now being opened breaks the normal circuit which otherwise continues down to the main A. C. supply line 68. However, when relay 64' is raised the circuit for the frequency controller motor 41' is established in that the circuit from the lower side of motor 41' is connected to the wire leading upwardly to the main A. C. supply while the top side of said motor is connected across switch S'b in position 2 to the upper right pair of contacts of relay 64' and thence downwardly to the A. C. supply wire 68. At the same time the A. C. current supply for the impedance bridge and field of galvanometer 37' is established from the left side of A. C. supply switch 38' down to the galvanometer field, thence across switch S'c in position 2 and across left upper pair of contacts of relay 64' and thence upwardly along wire 39 to the right side of A. C. supply switch 38'.

If it was a decrease in frequency which caused the frequency relay 60' to close, then the contact-making device 40' of the frequency controller will transmit intermittent control impulses along wire 44' to the raising relay 35' thereby raising the output of unit No. 1 to reestablish normal frequency. An increase in frequency would cause the control impulses to be transmitted over a wire 42' from the frequency controller and thence down to the lowering relay 28' to decrease the unit output and thus correct the frequency. An independent base load bridge circuit is disconnected upon energizing and raising of relay 48', it being remembered that this relay is inserted in the bridge circuit connecting slide contacts 17' and 57' through galvanometer 19'.

Upon reestablishment of normal frequency which may be accomplished after the disturbing cause has been removed or the load sufficiently stabilized the operator releases relay 48', 63' and 64', thereby disconnecting frequency controller F' and again connecting the load controller L' with the independent unit load setter 56' and load transmitter 10'.

When unit 2 is disconnected from its parallel operation so as to operate independently, it will then be subject to frequency control through operation of frequency relay 60'' the circuit for which is substantially the same as that for relay 60' and may be briefly described as follows: Starting from bottom Fig. 1 at center the left contact of the A. C. supply switch 38'' is connected by wire 72 to one side of the coil of time delay relay 61'' the other side of which is connected to the upper contacts of the frequency relay 60'', the lower contacts thereof being connected to wire 62'' thence across the upper left pair of contacts of relay 49'' and along wires 73 and 74 which are directly connected to the right side of A. C. supply switch 38''. The various coils of frequency relay 60'' and of the other frequency relays are energized by the A. C. supply connections clearly shown. The frequency controller F'' is connected and the load controller L'' is connected in the manner as described for unit No. 1 and similar connections for both the frequency relay 60''' and the frequency controller F''' and load controller L''' are substantially the same as for the other units so that a detailed description of the wires is not necessary. It will of course be understood that the relays for each unit corresponding to relays 48', 63' and 64' are of the type requiring manual resetting and in all other respects are also the same.

Certain of the automatic-transfer operations hereinbefore described under type 2 may be effected manually, and therefore permanently, in the manner to be hereafter described under types 4, 5 and 6.

*Type 3 operation: all units under interconnected control with economic load distribution and with all units receiving frequency control impulses transmitted from any one frequency controller.*—In this operation master selector switch S is in position 3 and each of the unit selector switches is in position 1. In this case the wattmeter operated load transmitter resistances 10′, 10″ and 10‴ are balanced against each other through the galvanometer bridge circuits for the load controllers of the respective units except that the galvanometer circuit for load controller of unit No. 1 is shunted out thus permitting the frequency controller of this unit to effect the primary control of output thereof. During this operation the master load setter is entirely disconnected and the frequency controllers for units Nos. 2 and 3 are likewise disconnected. The frequency controller for unit No. 1 is maintained in operation simultaneously with the operation of the load controllers of units 2 and 3. The frequency controller in operation is so arranged with respect to the load controllers in operation that their respective control impulses will not interfere with each other. It will of course be understood that instead of selecting the frequency controller of unit 1 any other frequency controller might be employed if desired by making connections (not shown) similar to those at present employed for the frequency controller of unit 1, but in this case the load controller corresponding to the frequency controller to be used will be disconnected.

The disconnection of master load setter upon setting of the selector switches is seen by the fact that the wire leading to the slide contact 18 has no connection to the master selector switch Sg in position 3. The galvanometer 19′ for the load controller L′ is shunted out by wires leading upwardly from the galvanometer 19′ to switch S′g in position 1, thence through wire 21, across master switch Sg in position 3 to wire 47 connected to the other side of galvanometer 19′. The unit load transmitter resistances are balanced against each other in that the potential connections to each end of the resistances are the same as previously described it being noted that the circuit leading away from slide contact 17′ extends across master switch Sg in position 3 to wire 21, upwardly along wire 50 to wire 20, along this wire to a wire leading to unit selector switch S″g in position 1 and thence across to the galvanometer 19″ from which the circuit continues upwardly to slide contact 17″ of the load transmitter of unit 2. Similarly a wire 20 is connected across switch S‴g in position 1 to galvanometer 19‴ and thence upwardly to slide contact 17‴ of the load transmitter of unit 3.

The frequency controller F″ is disconnected when section c of switch S″ is in position 1 thereby disconnecting the galvanometer field thereof, whereas sections d and e disconnect the contact-making device 40″ and section b also when in position 1 disconnects the operating motor 41″ of the contact-making device. Similar disconnections are effected for the frequency controller F‴.

Frequency controller F′ of unit 1 is maintained in operation in the following manner. The galvanometer field circuit extends from the left contact A. C. supply switch 38′ downwardly to the galvanometer field, thence through unit selector switch S′c in position 1 and over to master selector switch Sc in position 3 and thence around and upwardly along wire 39 and over to the other side of the A. C. supply switch 38′. It will of course be understood that the A. C. supply switches 38′, 38″ and 38‴ while connected to their respective units are nevertheless connected to the system line when the units are connected in parallel operation, thus insuring that the frequency impressed upon frequency controller F′ is that of all of the units or system rather than just one unit. The individual A. C. supply switches permit the unit frequency controllers to be responsive to the frequency of each independent unit when the units are not connected in parallel.

The circuit for frequency controller motor 41′ includes a wire extending upwardly and to the left from said motor, thence across unit switch S′b in position 1, across master switch Sb in position 3 to the other side of the A. C. supply line 68. The load controller L′ is maintained in partial operation by having its motor 67′ continuously operated due to the circuit continuing from the motor down and over to unit switch S′a in position 1 and thence across master switch Sa in position 3 and to the main A. C. supply line 68. Operation of motor 67′ causes continuous operation of the contact-making device 23′ but due to galvanometer 19′ being shunted out the normal contact-making element will not be closed at any time. However, there is mounted upon the continuously rotating camshaft two special contacts diagrammatically indicated at 77′ and 78′. Similarly identified contacts are provided for the load controllers L″ and L‴ all of which are connected to common wires 79 and 80. The purpose of these special contacts is to insure that frequency control impulses from controller F′ will not overlap or interfere with load control impulses from the load controllers L″ and L‴.

The circuit for contact-making device 40′ is supplied from one side of the D. C. line by wire 27′ which is connected also (lower right corner Fig. 1) across switch 26 in its up position to D. C. supply line 25. The circuit when closed through wire 42′ is connected across unit switch S′d in position 1, master switch Sd in position 3 and thence along wire 79 to contacts 78′, 78″ and 78‴, a return circuit from these latter contacts being through wire say 24′, across switches S′h in position 1 and master switch Sh in position 3 and thence down to wire 43′ to lowering relay 28′ of the load adjusting motor 29′. The return circuits for contacts 78″ and 78‴ are through wires 24″ and 24‴ respectively, these connecting through the unit selector switches S″h and S‴h each in position 1 and thence down to the lowering relays 28″ and 28‴. It is thus seen that if the system frequency should rise thereby closing the circuit through wire 42′ of the frequency controller F′ the frequency control impulses would be transmitted through contact 78′, 78″ and 78‴ to the lowering relays to each load adjusting motor, thereby tending to return the frequency to normal. However, it may be that each unit will not be adjusted identically or to the same extent each time a control impulse is impressed upon their load adjusting motors with the result that the load will not be equally distributed between all units for maximum combined efficiency. In this case the output of the units being different the wattmeters will cause different adjustments of the load transmitting resistances 10′, etc. and accordingly cause differences in potential between their slide contacts 17′, etc. with the result that load control impulses are now impressed upon the respective units so as to equalize the output between the units. The load control impulses are transmitted alternately with the frequency control impulses for the reason that the cams for the special contacts 78′, etc. are angularly displaced from the cams for the normal contacts by say, 180°.

The load controller L′ of unit 1 merely transmits frequency control impulses to this unit through the special contacts and no load control impulses are necessary because this unit is used primarily for frequency control. The other two units are readjusted upon any variation in output of unit 1 so as to obtain economic division of load between all units, this division of load being effected automatically through the load controllers of units 2 and 3 and associated circuits.

The contact-making camshafts of each of the load controllers are shown as being mechanically independent of each other although under certain conditions of operation it is desirable to have these camshafts either electrically or mechanically connected so that they will all have the same phase relation, thereby insuring that frequency control impulses are simultaneously transmitted to each unit followed by load control impulses being simultaneously transmitted to each unit. This synchronous relation of the shafts may be effected either electrically as by having the motors 67', etc. of the synchronous type and arranged to be maintained in the same phase relation at all times or of having said motors mechanically arranged as by a common camshaft in which case the contact-making devices of all load controllers would be continuously rotated throughout operation of the control equipment. This, however, would not necessarily mean that control impulses would be continuously transmitted to each unit if such were not desired because by disconnection of the galvanometer circuits of the frequency and load controllers for the particular unit to be disconnected impulses would not be transmitted. Such a mechanical connection between the camshafts is shown in my copending application Serial No. 525,355, filed March 26, 1931.

*Type 4 operation: interconnected control of all units for station base load without automatic transfer to either frequency or independent load.*— In this operation it is desired that a fixed total output of the station shall be maintained irrespective of changes in load demand or frequency variations within certain limits. If for any reason the frequency variations are greater than the permissible limits then a protective circuit automatically disconnects the entire automatic equipment, whereupon each unit is under the control of its individual speed governor in the same manner as is usual in the ordinary operation of hydro-electric units. When the automatic equipment is thus disconnected the units of course may or may not remain connected in parallel depending upon the condition of operation.

To accomplish this fixed station output the master load setter 12 is adjusted for the given station output, whereupon the unit load transmitter resistances 10', etc. automatically equalize the load between all of the units so as to maintain the given output. In this case the master selector switch is in position 4 and the unit selector switches are each in position 1.

The operation and circuits for the load controllers L" and L''' are the same in this type 4 operation as they were for type 3 operation in that in each case the unit selector switches are in position 1; thus the load controllers are in operation and the frequency controllers are disconnected. However, for unit 1 it is now necessary to disconnect the frequency controller and also disconnect the shunt around the galvanometer 19' of load controller L' to thereby reconnect galvanometer 19' in the bridge circuits of the master load setter and transmitters. This is done when master selector switch is moved to its position 4 in that the circuit for galvanometer 19' now extends upwardly therefrom to switch S'g in position 1 and upwardly to wire 21 across master switch Sg in position 4 and thence upwardly to master load setter slide contact 18 while the circuit leads from the other side of galvanometer 19' upwardly along wire 47 and thence over to slide contact 17'. The shunt circuit which leads in the other direction from wire 47 and connected to section g of master switch S is broken thereby disconnecting the galvanometer shunt.

The frequency controller F" is disconnected in that the wire leading downwardly from the galvanometer field and across switch S'c in position 1 is disconnected in position 4 of the master load setter. The frequency controller motor is also disconnected by movement of section b of master switch S to position 4. The lowering and raising contact circuits 44' and 42' of the frequency controller are also broken by master switch Sd and Se each in position 4.

The control impulses will now be transmitted to the lowering and raising relays of each unit in the manner as previously described with other operations.

*Type 5 operation: all units connected in parallel with independent unit base load control.*— In this operation the master selector switch may be in any of its four positions but the unit selector switches are in position 4. This results in the galvanometer circuit for each load controller being bridged across the unit load setter and unit load transmitter of only its respective unit. All frequency controllers are disconnected. The galvanometer circuit for the load controller now extends from slide contact 17' of unit load transmitter 10' over to and along wire 47 to galvanometer 19' thence upwardly to unit selector switch S'g in position 4 and thence upwardly along wire 58' to slide contact 57' of the unit load setter 56'. The load adjusting motor relays 28' and 35' will now respond only to load control impulses caused by variations from the fixed output of this particular unit alone. The galvanometer circuit for the load controllers of the other two units are similarly independently bridged across contact 17" and 57", and 17''' and 57'''.

As a result the unit load setters may be adjusted for unit outputs independently of each other. The general mode of operation of this type is the same as the independent base load control of type 2 operation with the exception that the automatic transfer provisions are disconnected in the type 5 operation.

*Type 6 operation: each unit independently connected to a separate system with manual establishment of independent frequency control for each unit.*—To disconnect the parallel operation of the units so that each unit can independently supply separate customers or systems and at the same time maintain normal frequency on each separate system unit, selector switches are placed in position 3 while the master selector switch may be in any position. The load controllers for each unit are thus disconnected and the frequency controllers are connected to their respective units independently of each other. In this case the galvanometer circuits for the frequency controllers are connected to the system which the particular unit is supplying. For example, the field of galvanometer 37' unit No. 1 is connected to the left contact of the A. C. supply switch 38' while the other side of this switch is connected through wire 39 to unit selector switch S'c in position 3 and thence to the other side of the galvanometer field. The frequency controller motor 41' is also connected by the wire leading upward therefrom to selector switch S'b in position 3 and thence downwardly to the main A. C. supply line 68, it being understood that the diagram of Fig. 2 is now applicable to the parallel system. The corresponding circuits for the other units Nos. 2 and 3 are the same as for unit No. 1 while the transmission of frequency control impulses to the load adjusting motor relays is the same as previously described with other operations. Of course when each unit is disconnected from the parallel system and connected to its independent system the switches 54', etc. are closed with consequent energization of the sets of relays such as 49', 48', 63' and 64' as was the case with the automatic transfer but the closing of these relays in this type 6 operation does not in any way affect the operation because the return wire from each of the relay contacts to the selector switches is connected to an open contact.

*Protective circuit.*—As described in my other copending applications it is desirable to disconnect, preferably automatically, the automatic control equipment when changing from one type of operation to another or upon occurrence of any abnormal conditions arising in the control equipment or system.

The protective system as applied to the present application consists in having the plus side of the D. C. supply from switch 32, lower left corner Fig. 1, connected across the upper right pair of contacts of relay 85. This relay is energized by current supplied through a circuit which is connected in series through various instruments and sections of the selector switches which, if in normal operation or condition, will cause energization of relay 85 and closure thereof in up position, thereby supplying current to the control equipment. This circuit extends from the plus or left side of D. C. supply switch 32 across contacts of relays 86 and 87 and thence upwardly from relay 87 to a set of special contacts in a frequency recorder FR which as described in my other applications are adapted to open upon a predetermined high or low frequency. The circuit continues from these contacts to the left side of a high and low load-limit switch 88. The elements above and to the right of the dotted square FR, Fig. 1, connected to the load recorder generally shown at 88, are identical with the mechanism generally shown at 400 in Fig. 4 of my copending application, Serial No. 408,544, and hence will not be described in detail in this application. A motor 88a drives the recorder 88 whose galvanometer field 104 is supplied with potential from a transformer 88b. The recorder 88 specifically is a high and low load limiting device interconnected with a protective circuit in such a manner that a continuous circuit is made through a selector switch 88c to wire 89 and thence to master switch Si. The connection through the selector switch 88c is maintained provided that the output of the station is within certain given limits determined by the setting of the selector switches. When these limits are exceeded, the circuit is opened, thus tripping protective relays as herein described to cut off the power from the control circuit until reset by the operator. The master switch Si when in position 2 (as in type 2 operation) will be connected to the wire leading from relay 87, thereby shunting out the special contacts of the frequency recorder and also the high and low load-limit switch 88 as the operation of these two instruments is not desirable during this type of operation. While these two instruments are thus shunted out the protective circuit continues on through wire 90 to unit selector switch S'j and in each position thereof, except No. 1, the circuit continues over to switch S''j from which in any position thereof, except No. 1, the circuit continues over to switch S'''j. The circuit continues on from this switch but it is desired to revert first and consider other positions of the master switch Si. Positions 1 and 3 of the selector switch are connected through S'i, over to S''i and thence to S'''i which is connected to the contacts of section j of switch S'''. Returning again to master switch Si in position 4, this is connected to S'k, over to S''k and thence to S'''k which is also connected to the contacts of sections j and i. The circuit from these three sections continues out through wire 91 to normally closed push button switches 93, across the upper left pair of contacts of relay 94 through the coil of this relay and back to the right side of the D. C. supply switch 32. Relay 85 is also connected in parallel with relay 94.

Due to any one of the following causes the protective circuit will be broken: Failure of any of the phases of the A. C. supply which will cause relay 86 or 87 to become deenergized, thus breaking the circuit to the positive D. C. Upon occurrence of abnormal frequency the contacts in the frequency recorder will open the protective circuit. If the station output exceeds or falls below the settings as indicated on the high and low load-limit switches, this circuit will be broken. Upon any change in the settings of the selector switches S', S'' and S''', the circuit will be momentarily broken, thereby deenergizing relays 94 and 85 which remain open because the supply comes through the upper left contacts of relay 94. The protective circuit can also be broken manually by the opening of the push button switches 93. In order to again close the protective circuit it is necessary to close the push button switch 96 which energizes relays 94 and 85 by completing a circuit from the left side of supply switch 32 across contacts of relays 86 and 87 which are normally closed, providing the A. C. supply is maintained. The circuit thus continues from relay 87 down through the normally open switch 96 to energize relays 94 and 85 whereupon their contacts will be closed to reestablish the protective circuit, providing the condition which caused the protective circuit to be disconnected has been corrected. If the abnormal condition still exists relays 94 and 85 will be immediately released, providing of course that the operator has removed his hand from switch 96. If desired switch 96 may be of the type which may be closed momentarily but not held closed, thereby preventing the operator from holding the protective circuit in against the action of the abnormal conditions. In the form shown, however, switch 96 is the type which may be permanently closed.

Various visible and audible signalling arrangements are incorporated in the protective circuit such for instance as a bell generally indicated at 97 and lights generally indicated at 98. These lights are suitably connected, as shown, across the various circuits and relays so as to indicate when certain types of operation or certain conditions exist. The lights may be of different colors or any combination of colors may be employed.

*Interrupter and totalizing circuits.*—As shown and explained in my first copending application an interrupter generally indicated at 100 is adapted to be inserted in the circuit for transmitting the control and frequency impulses to the load adjusting motor relays. This interrupter is inserted by throwing switch 26 to its down position whereupon (lower right corner Fig. 1) current is supplied from D. C. line 25 through the lower right contact of switch 26 to the interrupter contacts which are shown as being continuously driven by a suitable motor while the other side of this intermittently interrupted circuit is connected to wire 27 leading to each of the load controllers and also leading to the contact-making devices of each of the load controllers and frequency controllers. The result is that both the frequency and load control impulses are broken up into shorter impulses, thereby insuring more stable control and operation of the units.

The circuit for totalizing the output of all units includes (top of Fig. 1) rotatable resistances 101', 101" and 101'''. These resistances are connected to the same shaft with the unit load transmitters 10', etc. so as to be adjusted in accordance with the output of each particular unit. To totalize the unit outputs these resistances are connected in series by a wire 102 leading from transformer 15' and connected to one end of resistance 101', thence out through a slide contact 103 which is connected to one end of resistance 101", through another slide contact which is connected to one end of the other resistance 101''' and thence out the slide contact thereof over to a totalizing wattmeter generally indicated at 104 and back to transformer 15'. As the output on each individual unit changes, the accumulative effect of the resistances 101, etc. will be reflected upon the totalizing wattmeter 104.

*Manually initiated automatic transfer. Load to condenser.*—Each unit is provided with the following described equipment but for purposes of understanding only one unit need be described. It will be assumed that this unit is on load and is to be transferred to condenser automatically when a control room push button is closed manually. See Fig. 3.

An operation selector switch 111 is placed in down position and a type selector switch 110 is moved to its up position. The usual turbine gate whether of the wicket, plunger or cylinder gate type is open. In the event that the turbine power is adjusted through use of manually or speed governor controlled adjustable runner blades then these may be adjusted automatically so as to assist in transferring the unit in the same manner as though turbine gates were used alone. Adjustable runner blades or vanes will therefore herein be considered as broadly included as turbine gate mechanism. When the turbine gate mechanism is open, a penstock valve 111a is likewise open. This penstock valve may be of any suitable form such for instance as a butterfly valve or the so-called Larner-Johnson valve. It is assumed for purposes of illustration herein that a Larner-Johnson valve is employed of the type having a suitable pilot valve nose controlled plunger 111b; the pilot valve 111c being operated by a pinion shaft 111d extending laterally through the valve structure to the exterior where a gear and pinion 111e are provided for either actuating the pilot valve or for indicating the position of the plunger. The gears 111e and pilot valve 111c are actuated by an electric motor 111f which is automatically controlled in a manner to be described later.

To transfer the unit from load to condenser a control room push button 112 is momentarily closed, whereby a relay 113 is energized and its contacts closed by current supplied by D. C. wires 114 and 115. In view of push button switch 112 being only momentarily closed, a holding circuit is provided from contacts of relay 113 down through the relay contact bar and its stem to wire 116, across condenser contacts C₂, wire 117, across contacts B₃ and back to the coil of relay 113 to the other side of the supply 115. A circuit is also established from supply line 114, across relay contacts 113, operation selector switch contacts C, thence across type selector switch contacts B₂ and load limit contacts 118 to the closing field of a usual motor operated load limit mechanism such as shown in my application Serial No. 301,374 filed August 22, 1928, now Patent No. 1,901,831 and herein generally indicated at 119 from which the circuit continues to the other supply line 115. Upon energization of this load limit mechanism the pilot valve or any other suitable mechanism for controlling the gate operating servo-motor will be so actuated as to cause the turbine gate mechanism to move toward closed position. When the load limit mechanism has closed to 10% opening, whereby the gates will likewise assume a 10% opening, which is assumed for sake of description herein to be speed-no-load position, contacts 118 are opened automatically by the load limit mechanism thereby preventing further closure of the turbine gates, it being understood that the turbine gates will follow very closely any adjustment of the load limit mechanism as long as the load demand is sufficient to require gate adjustment. Any suitable mechanism may be used to effect opening of the contacts in accordance with the gate position or unit output but such devices need not be described here in detail as they have been variously described in this and other applications of mine.

Simultaneously upon establishment of the circuit through the motor operated load limit mechanism 119 a second circuit is established from type selector switch contacts B₂, through wire 120, across closed contacts 121 to wire 122 to energize and close a relay 123, and thence back to the other side of the D. C. line as by wire 124. Upon closure of relay 123 a circuit is established from D. C. supply line 114 through wire 125, across normally closed contacts 126 to wire 127, thence across contacts 129 to wire 130 and across closed contacts 131 to wires 132 and 133, across contacts of relay 123 to wire 134 and thence through relay 135 to the other side of the supply as by wire 136. Upon energization of relay 135 other contacts generally indicated at 137 are closed to establish a closing circuit for the usual electric motor 111f, Fig. 7, which is adapted when actuated to rotate pinion shaft 111d and thereby move pilot valve 111c to cause closure of the Larner-Johnson valve in a manner well understood in the valve art. To insure complete closure of this valve when contacts 118, 121 are opened at 10% of the turbine gate position, a holding circuit is established for relay 135 which extends from wire 133 to wire 138, across the closed contacts of relay 135 around to its coil and wire 136.

It is therefore seen that the unit is transferred to condenser operation due to the penstock valve being completely closed, even though the turbine gate mechanism remains at 10% gate opening.

Figure 7:
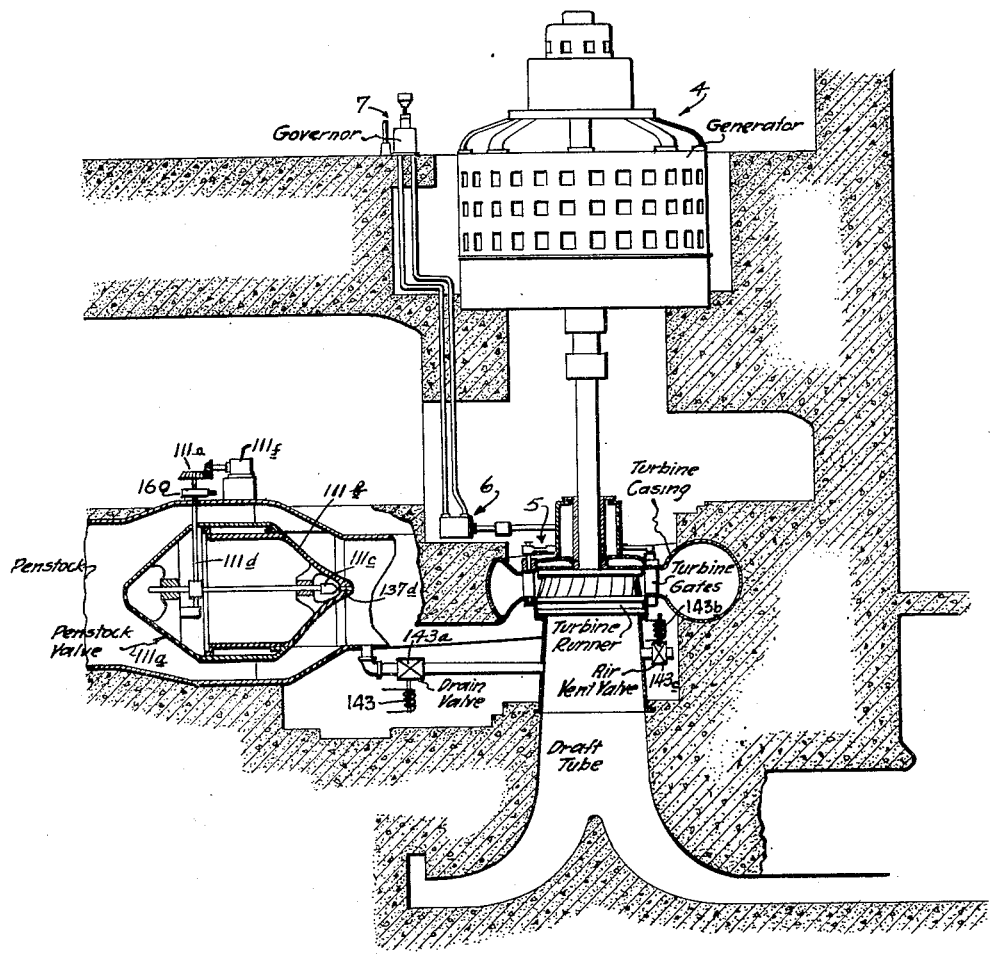
Fig. 7 is a vertical section of a turbine installation illustrating diagrammatically various elements embodied in my improved combination.

When the penstock valve has reached 1% opening, it closes contacts 140. These and other contacts are operated by suitable mechanism diagrammatically shown at 160 in the form of a disk carrying a pin adapted to successively actuate the contacts, the disc as shown in Fig. 7 being secured to pinion shaft 111d. Upon closure of contacts 140 a circuit is established from an A. C. supply line 141 (left side Fig. 3) across condenser transfer contacts C₁ to wire 142 and contacts 140, thence through a solenoid 143 to the other side of the A. C. supply. Energization of solenoid 143 opens a usual drain valve 143a, Fig. 7, preferably of the quick acting Johnson type for the turbine casing. A solenoid 143b, connected in parallel with solenoid 143 so as to be energized simultaneously therewith, causes a usual draft tube vent 143c to open, thereby unwatering the runner passage to reduce hydraulic friction to a minimum. If desired solenoid 143 may be used to operate or control only the drain valve, the draft tube vent valve being operated by any usual mechanical connection to the gate.

The penstock valve, of course, continues toward its closing position even after contacts 140 are closed and upon reaching full closed position load limit contacts 129 are automatically actuated by a suitable connection to the penstock valve. It is desired to energize the drain valve solenoid 143 by alternating current due to the possibility of the unit operating for a substantial period of time on condenser. The other supply lines 114 and 115 can be direct current, supplied if desired from a storage battery but circuits controlled thereby are closed for a relatively short period.

The use of the drain valve and its coordinated operation in relation to the other elements is found to be particularly useful in a low specific speed turbine where the runner blade form is such as to trap water between the inlet edge of the runner under and guide vanes. The runner under such conditions acts as a pump when the unit is motored from the line thus causing excessive losses by the pressure of the water so trapped. The drain valve and draft tube vent may of course be used with propeller and high specific speed Francis types of turbines.

*Manually initiated automatic transfer. Condenser to load.*—When it is desired to transfer the unit from condenser to load, operation selector switch 111 is moved to its up position, type selector switch 110 remaining in its up position. Upon changing the operation selector switch 111 from condenser to load, the holding circuit for relay 113 is broken due to opening of the condenser contacts C₂. However, with the operation switch in its upper or load transfer position momentary closure of push button switch 112 will cause re-energization of relay 113 and its holding circuit will again be established as by connection of wire 116, across contacts L₂ to wire 117, contacts B₃, and thence back to the other side of the relay coil 113. Upon energization of relay 113 a circuit is established from its contacts, across load contacts L₆ of the operation selector switch, thence along wire 144, across contacts B₁ to wire 145 to energize and close a relay 146 which is connected to the other side of the supply line 115. Upon energization of relay 146 a circuit is established from D. C. supply 114 through wire 125, across contacts 126 to wires 127, 128, across closed contacts 147 to wire 148, thence through the contact bar and its stem of a relay 149 to wire 150, across closed contacts 151 of the penstock valve limit switch to wire 152, across contacts of normally closed switch 153, up to wire 154, thence across the closed contacts of relay 146 to wire 155 which energizes relay 156 that is connected by wire 136 to the other side of the D. C. supply. Upon actuation of relay 156 another set of contacts generally indicated at 157 are closed so as to start opening operation of the penstock valve operating motor. When the valve has opened 1% contacts 140 are opened, thereby de-energizing drain control solenoid 143 and closing the draft tube vent, thereby permitting the turbine to be subsequently properly operated. As the penstock valve continues to open with consequent continual operation of the load limit switch 160, contacts 161 and 162 are closed at 10% opening of the penstock valve. Contacts 161 are arranged through the cam as shown to open at 60% while contacts 162 remain closed above 10%. Upon closure of contacts 162 a circuit is established from wire 144, across contacts B₁, wire 163, contacts 162, wire 164, across normally closed contacts 165 to operate the motor operated load limit mechanism 119 in a direction to permit the gate operating servo-motor to open the turbine gates in accordance with whatever load demand there should be. Of course if the load should not require more than a 10% gate opening, the gates would remain at that opening even though the load limit is adjusted to permit full gate opening. When the load limit mechanism opens to full 100% open position contacts 165 are opened automatically thereby as previously mentioned. Upon closure of contacts 162 a further circuit is established through wire 167 to relay 149 and thence to the other side of the D. C. supply. When relay 149 is raised it breaks the circuit through wire 148, thereby breaking the circuit through wire 150 which ultimately passes through relay 156 as previously described, whereby upon deenergization of relay 156 its contacts open and stop operation of the electric motor for the penstock valve. However, when the valve motor is thus stopped as by closing contacts 162 the closure of contacts 161 initiates operation of a hydraulic motor which continues the opening of the penstock valve. This is effected by the energization of a solenoid 168 which causes opening of the hydraulic motor that preferably is of the impulse turbine type, this motor being provided preferably with a needle nozzle which is mechanically closed as by a spring or otherwise upon deenergization of the solenoid 168. The penstock valve thus continues to open and upon reaching 60% open position opens contacts 147 and closes contacts 169 while at the same time opening contacts 161 but allowing contacts 162 to remain closed. Upon closure of contacts 169 current is supplied from the D. C. supply line 114, to wires 125, 127 and 128 to contacts 169, wire 170, thence through the contact bar and stem of relay 149 to wire 150, across contacts 151, wire 152, contacts 153, wire 154, across contacts of relay 146 to wire 155, thence through relay 156 to wire 136 and the other side of the D. C. supply, thereby raising relay 156 and closing a set of contacts 157 which operate the electric motor for continuing the opening of the penstock valve. When the penstock valve is open to its full position, it automatically opens contacts 151, thereby stopping the actuating motor.

The hydraulic motor is used to effect the largest part of the opening of the penstock valve because of its greater power with consequent faster opening of the penstock valve. The size and cost of the electric motor, therefore, will be much smaller than if an electric motor was used alone for effecting an equal rate of fast opening.

*Exclusive manual control of transfer.*—In the operation of hydraulic units it is desirable to have suitable control means in the turbine pit so that in case an operator is in the pit and desires to shut down or open the turbine he may effect such operation without the necessity of going up to the control room to operate the push button 112. It will, of course, be understood that the manual control equipment to be described now could be located at any convenient point but it is assumed for purposes herein that the same is located in the turbine pit.

*Exclusive manual control (cont'd): condenser operation.*—Type selector switch 110 is moved to its down position whereupon by closing the lower pair of contacts of switch 153 a circuit is established from one side of the D. C. supply 114 through wire 125, contacts 126, wires 127, 128, across contacts 129, wire 130, across contacts 131 to wire 132, and across the lower closed contacts of switch 153 to wire 134 and relay 135 to wire 136 on the other side of the D. C. supply. Energization of relay 135 establishes a holding circuit from wires 132, 133, 139, across the contacts of relay 135 to the other side of the supply. Actuation of relay 135 operates the contacts 137 for the penstock motor whereupon the valve closes in the usual way until limit switch operating mechanism opens contacts 129 of the penstock valve and at the same time of course closes contacts 151 to render the equipment ready for reopening of the valve. The remaining contacts such as 147, 169, 161, 162, etc. are ineffective during this operation and hence consideration does not need to be given to them.

*Exclusive manual control (cont'd): load transfer.*—To transfer the unit to load, the lower set of contacts of switch 131 is momentarily closed, thereby establishing a circuit from D. C. supply line 114 through wire 125, across contacts 126 to wires 127 and thence to the left along wire 128, across contacts A₁ of type selector switch to wire 174, across contacts 151, wire 152, across upper pair of contacts of switch 153, across the lower contacts of switch 131, thence to wire 155 and relay 156, to wire 136 connected to the other side of the D. C. supply 115. Upon energization and closure of relay 156 a holding circuit is established from wire 136, across to the left contact of the closed relay 156, thence along wire 175, across upper closed contacts of switch 153, through wire 152, etc. to the other side of the D. C. supply. The contacts 157 adjacent relay 156 are thereupon actuated to effect actuation of the penstock valve motor to effect opening of the valve.

*Exclusive manual control superimposed upon semi-automatic control.*—If the type selector switch 110 remains in its up position for permitting semi-automatic control to be initiated by closure of push button 112 still the turbine may be started up or shut down by the operator in the pit merely by suitably manipulating the controls just described.

For instance by simultaneously pushing switches 131 and 176 to their down position a circuit is established from D. C. supply line 114 through wire 125, across closed contacts of switch 126 to wire 127 and down to the closed contacts 176, thence to wires 178 and 150, across contacts 151, wire 152, upper contacts 153, thence across the lower contacts 131 to wire 155 and relay 156 to wire 136 and the other side of the supply. A holding circuit is established from contacts 153 to wire 175 for relay 156. The valve is thereupon opened due to closure of contacts 157 for actuating the penstock valve as previously described.

To close the valve, switch 153 only need be operated. It is moved to down position whereupon a circuit is established from one side of the supply through wire 125, contacts 126, wire 127, 128, contacts 129, wire 130, upper contacts 131, wire 132, and across the lower contacts 153, wires 134 and relay 135 to wire 136 and the other side of the line. Contacts 137 are thereupon closed to effect actuation of the valve. A holding circuit is also established as by wire 139.

Figure 3:
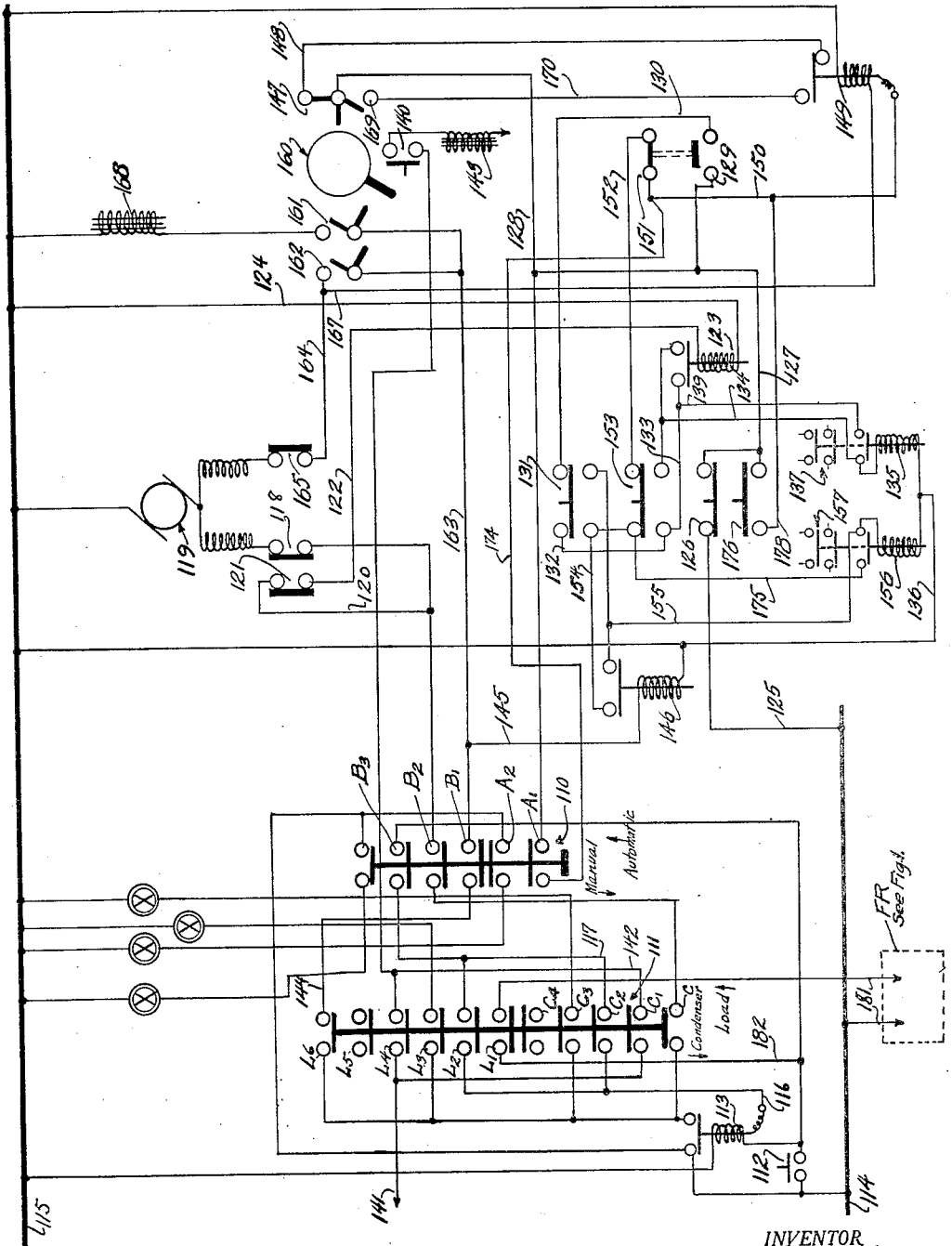
Fig. 3 is a continuation of the form shown in Fig. 1.

*Transfer from condenser to load automatically upon occurrence of low frequency.*—As previously stated each generating unit is provided with the equipment shown in Fig. 3. Assuming that one unit is on load and two units are on condenser and that it is desired to have one of these condenser units transferred to load automatically upon occurrence of a predetermined low frequency, the operation selector switch 111 and the type selector switch 110 each for that particular unit will be placed in their upper position. It is desired that the other condenser unit shall remain on condenser and not be transferred. To accomplish this its operation selector switch is placed in down or condenser position while the type selector switch for this unit may be in either position.

The result is that upon occurrence of a predetermined low frequency (upper left corner Fig. 1) contacts 180 of a usual frequency recorder diagrammatically indicated at FR will close, thereby establishing a circuit from one side of the D. C. supply 114 through wires 181, across closed contacts L₁, wire 182 and relay 113 to energize and close the same. Energization of relay 113 establishes the same circuits as when push button switch 112 was closed. The unit will, therefore, be transferred automatically to load upon occurrence of a predetermined low frequency while any other unit, even if on condenser but with its operation selector switch remaining in condenser position, will not be transferred. However, if these other condenser units have their operation selector switches in automatic position then they too will be automatically transferred with the other condenser unit. It will, of course, be understood that generally it is not desired to have more than one unit on condenser for the sake of economic operation. A unit when once transferred to load will remain on load even though normal frequency is restored, this being due to the holding circuit for relay 113. Lights are provided for indicating the type of operation for which the switches 110 and 111 are set.

*Feed-back prevention arrangement to permit simultaneous transmission of load and frequency control impulses.*—In the arrangements previously described in this or other applications, means have been especially provided to permit simultaneous operation of the frequency and load controllers without interference between the frequency and load control impulses. This special means consisted primarily of contacts operated in a fixed relation with respect to other contacts. With such an arrangement the load control impulses were definitely broken, during which broken period the frequency control impulses were transmitted, thereby causing alternate transmission of the impulses.

In the modified arrangement to be described now, the frequency and load controllers are not operated in any fixed mechanical relation but are permitted to operate independently and even though their respective impulses might be simultaneously created and transmitted, still only one or the other will finally be effective upon the load adjusting motor. In this way not only are the controllers simultaneously operative but also the impulses are simultaneously transmitted, and in fact simultaneously imposed upon the load adjusting motor. Due to my improved feed-back prevention the load and frequency control impulses are arranged to have one take priority over the other, while specifically the load controller for a unit is arranged to have its control impulses take priority over frequency control impulses.

The improved arrangement is only diagrammatically illustrated in Fig. 6 but it can be applied to the equipment described herein or in other applications. It will suffice, however, to show only one of the frequency controllers such as F'' although any of the other frequency controllers F'' or F''' could be employed. The load controllers for units 1—3 are shown at L'—L''' while the load adjusting or synchronizing motor relays are shown at 28', 35', etc., these reference numbers corresponding to the elements of the same numbers in the preferred form. If the frequency variation falls below normal then the oscillatable contact bar 200 of the frequency controller F'' transmits intermittent impulses through wire 201 to a common bus 202, which is connected through resistances 203', 203'', etc., to wires 204', etc. thereby energizing raising relays 35', 35'', etc., from which the current returns to the other side of the supply wire 33. If the frequency variation is such as to necessitate lowering of the output, then frequency control impulses are transmitted through wire 205 to a common bus 206, from which the impulses are transmitted through resistances 207', 207'', etc. and down through wires 208', etc. to the lowering relays 28', etc. So far it is seen that the frequency correction impulses will cause actuation of the relays 28' or 35', etc. in the manner to effect proper correction of the frequency.

To permit simultaneous transmission of the load control impulses the load controllers such as L' are connected to the wires 204' and 208' on the inside of the resistances 203' and 207' with the result that should a lowering frequency impulse be transmitted through wire 208' so as to close relay 28' simultaneously with the operation of a raising load control impulse through wire 204' to close relay 35', it is seen that the load adjusting motor would simply be neutral and held against rotation in either direction. If the load controllers and frequency controllers had the same rate of rotation then there is of course the possibility that the lowering frequency impulses would occur simultaneously at all times with the load raising impulses thereby resulting in the load adjusting motor never being actuated, but in practice the frequency and load controllers will not maintain absolute synchronism with each other even though driven at the same rate although in order to positively prevent continuous simultaneous transmission of the opposing impulses the load controllers may be operated faster than the frequency controllers or vice versa. However, it is seen that when one of the controllers momentarily does not transmit its impulses the impulses from the other controller may then be instantly effective to actuate the load adjusting motor.

To insure that the load controller for one unit will be effective only on that unit even though it is electrically connected to the circuits for the other units, the resistance 203' has sufficient electrical resistance so that in combination with the electrical resistance of resistance 203'' or 203''' any load control impulse which tends to be transmitted from the raising cam 209' will have its current sufficiently reduced in passing through the combined resistances 203' and 203'' that it will be unable to sufficiently energize relay 35'' to close the same. The same is also true of the other resistances 207', 207'' and 207'''. Therefore, it is seen that the raising or lowering impulses of the load controller of one unit will not affect the other units, and yet at the same time the frequency control impulses may be readily transmitted to each of the units. It can be seen from the foregoing that in case the frequency drops, raising impulses are transmitted to each unit and simultaneously and in addition the load is redistributed between the various units in accordance with a predetermined schedule of operation, preferably the economic schedule. This redistribution is effected due to the unit wattmeters or other unit load indicating devices causing the galvanometers of each unit to either raise or lower the output of their respective units.

*Modification of feed-back prevention. Relay control.*—In Fig. 4 the frequency and load controllers are not mechanically connected and yet means are provided for positively preventing simultaneous transmission of load and frequency control impulses to the relays of the load adjusting motor. In this modified form either one impulse or the other is given an unrestricted path to the raising and lowering relays. To accomplish this a wire 215' from the lowering side of a frequency controller is connected to a contact 216' and also to the coil of a relay 217' which is connected to the other side of the supply. A second contact 218' is connected to the lowering side of the load controller L' while the stem of the relay contact bar is connected through a flexible lead 219' to the lowering relay coil 28'. When a load control impulse is transmitted to contact 218' from controller L', the impulse will continue through the relay stem to the lowering relay 28' and actuate the load adjusting motor 31' accordingly. A frequency impulse cannot be impressed simultaneously upon relay 28' because contact 216' is open. However, if a frequency impulse is created it will energize relay 217' and raise the same to close contact 216' whereupon the frequency impulse will be transmitted to relay 28'. When contact 216' is thus closed, load contact 218' is opened to prevent transmission of load control impulses. The frequency impulses thereby take preference over the load control impulses due to controlling the coil of relay 217' although it is clear that the load impulses could be used to energize relay 217' instead of frequency impulses. The other half of the control circuit and relays is not shown but it would simply duplicate the first half and the whole would be duplicated for each unit.

*Fig. 5 modification.*—In this arrangement means are provided for requiring only a small current to flow through the controller contacts and yet permitting the necessary current for the relays. This arrangement may be employed with any of the previously described controls in that wires 220 and 221 correspond to the raising and lowering wires such as 206 and 202 leading to the load adjusting motors. These wires here however are supplied by current from a separate source 223. When a lowering frequency impulse is transmitted from frequency controller such as F' it will energize a relay 224 to close contacts 225 and allow current to be supplied to wire 220 or a raising impulse will energize a relay 226 to close contacts 227 and supply wire 221. This control is duplicated for each unit.

Instead of operating a unit or units as condensers for purposes of power factor correction or for carrying a portion of the wattless current, the unit can be kept in parallel with the system with varying amounts of excitation so that little or no condenser effect is present, thus causing the machine to be merely held in reserve for generating service.

Selector switches 301 and 302, shown immediately above the left end of frequency recorder FR, have been included to automatically indicate the connection of the frequency recorder to any one of the three unit potentials corresponding to the three generating units 1, 2 and 3 as shown in Fig. 2. The connection from these frequency recorder selector switches 301 and 302 can be made in any desired manner as 301 and 302 are connected in parallel with F', F'', F''' respectively through switches 38', 38'', 38'''.

It will of course be understood that while several forms of my invention have been shown and described along with several functions performed thereby, yet other functions may be performed and various changes may be made without departing from the spirit of the invention as set forth in the appended claims.

I claim:

1. A control system for a plurality of prime mover operated alternating current generating units normally connected in parallel to a main system and from which a plurality of customers or sub-systems are supplied, means for distributing the load between said units automatically in accordance with a predetermined schedule of operation, means for disconnecting one of said units from the main system and supplying an individual customer or sub-system from said disconnected unit, and means whereby upon said disconnection said automatic means for distributing the load between all of the units is rendered inoperative.

2. A control system for a plurality of prime mover operated alternating current generating units normally connected in parallel to a main system and from which a plurality of customers or sub-systems are supplied, means for distributing the load between said units automatically in accordance with a predetermined schedule of operation, means for disconnecting one of said units from the main system and supplying an individual customer or sub-system from said disconnected unit, and means whereby upon the disconnection of said unit from the system line all of the units are automatically placed on independent base load.

3. A control system for a plurality of prime mover operated alternating current generating units normally connected in parallel to a main system and from which a plurality of customers or sub-systems are supplied, means for maintaining all of said units on station base load, means including usual circuit breaker apparatus for disconnecting one of said units from the main system line in order to supply an individual customer or sub-system from the disconnected unit, and means whereby upon opening of said circuit breaker all of the units are automatically transferred to independent base load.

4. A control system for a plurality of prime mover operated alternating current generating units normally connected in parallel to a main system and from which a plurality of customers or sub-systems are supplied, means including a master load setter for distributing the station load between all of said units automatically in accordance with a predetermined schedule of operation, means for disconnecting one of said units from the main system in order to supply an individual customer or sub-system from the disconnected unit, and means whereby upon said disconnection of the unit from the main system all of the units are automatically placed upon independent base load, said latter means including unit load setters which are automatically substituted for said master load setter upon the transfer to independent base load.

5. A control system for a plurality of prime mover operated alternating current generating units normally connected in parallel to a main system and from which a plurality of customers or sub-systems are supplied, means including a master load setter for distributing the station load between all of said units automatically in accordance with a predetermined schedule of operation, means for disconnecting one of said units from the main system in order to supply an individual customer or sub-system from the disconnected unit, means whereby upon said disconnection of the unit from the main system all of the units are automatically placed upon independent base load, and means whereby another unit may be subsequently disconnected from the main system in order to supply another customer or sub-system without changing the base load control of the units as initiated upon disconnection of the first unit.

6. A control system for a plurality of prime mover operated alternating current generating units normally connected in parallel to a main system and from which a plurality of customers or sub-systems are supplied, means for effecting a predetermined load distribution between all of said units when connected to the main system automatically in accordance with a predetermined schedule of operation, means whereby upon disconnection of a unit from the main system in order to supply an individual customer or sub-system the units are automatically placed upon independent base load, and means whereby upon variation in frequency from normal on said disconnected sub-system the unit supplying said system is automatically transferred from independent base load to frequency control.

7. A control system for a plurality of prime mover operated alternating current generating units normally connected in parallel to a main system and from which a plurality of customers or sub-systems are supplied, means for effecting a predetermined load distribution between all of said units when connected to the main system automatically in accordance with a predetermined schedule of operation, means whereby upon disconnection of a unit from the main system in order to supply an individual customer or sub-system the units are automatically placed upon independent base load, and means adapted upon a predetermined variation in frequency from normal on said sub-system to permanently transfer the sub-system unit from independent base load to frequency control whereby the unit remains on frequency control even upon subsequent restoration of normal frequency.

8. A control system for a plurality of prime mover operated alternating current generating units normally connected in parallel to a main system and from which a plurality of customers or sub-systems are supplied, frequency controlling means for said units, means whereby said units are placed on independent base load automatically upon disconnection of one of said units from the main system in order for that unit to supply an individual customer or sub-system, and means whereby said frequency controlling means is rendered unable to control the units which remain connected to the main system.

9. A control system for a plurality of prime mover operated alternating current generating units normally connected in parallel to a main system and from which a plurality of customers or sub-systems are supplied, frequency controlling means for said units, means whereby said units are placed on independent base load automatically upon disconnection of one of said units from the main system in order for that unit to supply an individual customer or sub-system, means whereby said frequency controlling means is rendered unable to control the units which remain connected to the main system, and means whereby upon variation in frequency from a predetermined value on the disconnected sub-system the unit supplying the same is automatically connected to said frequency controlling means.

10. A control system for a plurality of prime mover operated alternating current generating units connected in parallel comprising, in combination, a galvanometer type of load controller for each of said units, a frequency controller, means including said load controllers for effecting a predetermined load distribution between all of said units, and means whereby the galvanometer circuit for the load controller of one of said units is adapted to be shunted out and said frequency controller substituted so as to cause said unit to control frequency.

11. A control system for a plurality of prime mover operated alternating current generating units connected in parallel comprising, in combination, load adjusting mechanism for each of said units, load and frequency controlling mechanisms of a type adapted to transmit electric control impulses, and a single set of relays associated with each load adjusting mechanism adapted to receive both frequency and load control impulses.

12. A control system for a plurality of prime mover operated alternating current generating units normally connected in parallel to a main system and from which a plurality of customers or sub-systems are supplied, load and frequency controllers one for each unit, means whereby all of said units are adapted to be placed under interconnected load control with the load controllers in use and the frequency controllers out of use, means whereby said units are adapted to be segregated for independent connection to separate customers or sub-systems, and manually operable selector switch apparatus adapted upon manual adjustment to establish independent frequency control for each unit after the units are segregated.

13. A control system for a plurality of fluid actuated prime mover electrical generating units each having a supply pipe for the actuating fluid, a valve in said pipe and mechanism for controlling flow of actuating fluid directly to the prime mover, means adapted when initiated to operate one of said pipe valves and its controlling mechanism so as to transfer its generating unit from load to condenser operation, and means for thereafter effecting a redistribution of load between said units.

14. A control system for a plurality of fluid actuated prime mover electrical generating units each having a supply pipe for the actuating fluid, a valve in said pipe and mechanism for controlling flow of actuating fluid through the prime mover, means adapted when initiated to operate one of said pipe valves and its controlling mechanism so as to transfer its generating unit from condenser to load.

15. A control system for a plurality of hydroelectric generating units each driven by a hydraulic turbine provided with adjustable turbine gate mechanism, a penstock and penstock valve, comprising, in combination, means adapted when initiated to effect transfer of one of said units from load to condenser while allowing another of said units to remain in operation including means whereby the turbine gate mechanism of the transferred unit is moved toward closing position and the penstock valve is completely closed automatically when said initiation is effected, and means whereby upon occurrence of said transfer operation the load is redistributed.

16. A control system for a plurality of hydroelectric generating units driven by hydraulic turbines each provided with adjustable turbine gate mechanism, a penstock and penstock valve, comprising, in combination, means adapted when initiated to effect only partial closure of the turbine gate mechanism and complete closure of said penstock valve for one of said turbines, and means for thereafter redistributing the load.

17. A control system for a plurality of hydroelectric generating units each driven by a hydraulic turbine provided with adjustable turbine gate mechanism, a penstock and penstock valve, comprising, in combination, means adapted when initiated to effect closure of the turbine gate mechanism of one of said units only to speed-no-load position and complete closure of said penstock valve, and means for thereafter redistributing the load.

18. A control system for a plurality of hydroelectric generating units each driven by a hydraulic turbine provided with adjustable turbine gate mechanism, a penstock and penstock valve, comprising, in combination, means adapted when initiated to effect only partial closure of the turbine gate mechanism of one of said units and complete closure of said penstock valve for said unit whose gate mechanism is partially closed, means whereby upon a predetermined closing movement of said penstock valve the turbine is automatically vented, and means whereby the load is redistributed automatically upon occurrence of said closing operation.

19. A control system for a plurality of hydroelectric generating units each driven by a hydraulic turbine provided with adjustable turbine gate mechanism, a penstock and penstock valve, comprising, in combination, means adapted upon initiation to effect closure of the turbine gates for said unit whose gate mechanism is partially closed automatically to a predetermined position in which position the gates remain, said means including hydraulic and electrical apparatus sequentially operative to close the penstock valve, and means whereby the load is redistributed automatically upon occurrence of said closure operation.

20. A control system for a plurality of hydroelectric generating units each driven by a hydraulic turbine provided with adjustable turbine gate mechanism, a penstock and penstock valve, comprising, in combination, means adapted upon initiation to transfer one of said units from condenser to load including means for opening the penstock valve thereof, means whereby upon a substantially predetermined opening of the penstock valve said turbine gate mechanism is adapted to be adjustable in accordance with the load demand, and means whereby the load is redistributed automatically upon occurrence of said closure operation.

21. A control system for a plurality of hydroelectric generating units each driven by a hydraulic turbine provided with adjustable turbine gate mechanism, a penstock and penstock valve, comprising, in combination, means adapted upon initiation to transfer one of said units from condenser to load including means for opening the penstock valve thereof, means whereby upon a substantially predetermined opening of the penstock valve said turbine gate mechanism is adapted to be adjustable in accordance with the load demand, means whereby when the penstock valve has a predetermined opening the turbine vent is closed, and means whereby the load is redistributed automatically upon occurrence of said closure operation.

22. A control system for a plurality of hydroelectric generating units each driven by a hydraulic turbine provided with adjustable turbine gate mechanism, a penstock and penstock valve, comprising, in combination, means adapted when initiated to close the penstock valve of one of said units completely and to partially close the turbine gates thereof, including hydraulic and electric motors for effecting actuation of the penstock valve at different rates, and means whereby the load is redistributed automatically upon occurrence of said closure operation.

23. A control system for a plurality of hydroelectric generating units each having a low specific speed hydraulic turbine provided with a wheel casing, guide vanes and a water-wheel whose blades are so shaped that water is adapted to be trapped between the wheel and guide vanes when the unit is motoring from the line, a draft tube, a penstock and a penstock valve, comprising, in combination, means adapted when initiated to effect automatically closure of one of said penstock valves of one of said units, draining of the wheel casing of said unit to permit discharge of any water tending to be trapped, and venting of the draft tube of said unit whereby the wheel may rotate freely in air, means adapted when initiated to effect automatically a relatively slow rate of priming of the wheel case by gradual opening of said penstock valve and then subsequently effecting a fast rate of opening thereof, and means whereby the load is redistributed automatically upon occurrence of said closure operation.

24. A control system for a plurality of hydroelectric generating units each driven by a hydraulic turbine provided with adjustable turbine gate mechanism, a penstock and penstock valve, comprising, in combination, a load limit mechanism one for each of said units for controlling the operation of the turbine gate mechanism for its respective unit, and means for controlling the penstock valve of the respective units also by its load limit mechanism, and means whereby the load is redistributed automatically upon occurrence of said closure operation.

25. A control system for a plurality of prime mover operated electrical generating units, means for transferring a unit from load to condenser, and means whereby an additional unit or units may be similarly transferred simultaneously with said other unit.

26. A control system for a plurality of prime mover operated electrical generating units comprising, in combination, load and frequency control means, load adjusting means associated with each unit and subject to the control of said frequency and load controlling means, and means whereby frequency and load control electrical impulses may be simultaneously created by and transmitted from the load and frequency control means to said load adjusting mechanism while allowing certain of the impulses to predominate.

27. A control system for a plurality of prime mover operated electrical generating units comprising, in combination, load adjusting mechanism for each of said units, frequency and load controlling means adapted to transmit electrical control impulses to a load adjusting mechanism, including a common circuit for both frequency and load impulses but having provision whereby one kind of said impulses is prevented from feeding back so as to interfere with the other.

28. A control system for a plurality of prime mover operated electrical generating units comprising, in combination, load adjusting mechanism for each of said units, frequency and load controlling means adapted to transmit electrical control impulses to a load adjusting mechanism, including a common circuit for both frequency and load impulses but having electrical resistances arranged so that one kind of said impulses is prevented from feeding back so as to interfere with the other.

29. A control system for a plurality of prime mover operated electrical generating units comprising, in combination, load adjusting mechanism for each of said units, frequency and load controlling means adapted to transmit electrical control impulses to a load adjusting mechanism, including a common circuit for both frequency and load impulses but having a relay control arranged so that one kind of said impulses is prevented from feeding back so as to interfere with the other.

30. A control system for a plurality of prime mover operated electrical generating units comprising, in combination, load adjusting mechanism for each of said units, frequency and load controlling means adapted to transmit electrical control impulses to a load adjusting mechanism, a relay having opposed contacts alternatively closed in accordance with whether frequency or load control impulses are to be transmitted, and means whereby upon closure of either contact said load adjusting mechanism is actuated.

S. LOGAN KERR.

CERTIFICATE OF CORRECTION.

Patent No. 2,010,594.   August 6, 1935.

SAMUEL LOGAN KERR.

It is hereby certified that error appears in the printed specification of the above numbered patent requiring correction as follows: Page 15, second column, line 11, claim 14, after "load" and before the period insert the comma and words , and means for thereafter effecting a redistribution of load between said units; and that the said Letters Patent should be read with this correction therein that the same may conform to the record of the case in the Patent Office.

Signed and sealed this 11th day of February, A. D. 1936.

(Seal)
Leslie Frazer
Acting Commissioner of Patents.